(12) United States Patent
Karimli et al.

(10) Patent No.: US 10,075,938 B2
(45) Date of Patent: Sep. 11, 2018

(54) DYNAMIC SELECTION OF DATA EXCHANGE MODE FOR TELECOMMUNICATION DEVICES

(71) Applicant: T-Mobile USA, Inc., Bellevue, WA (US)

(72) Inventors: Yasmin Karimli, Kirkland, WA (US); Puja Gupta, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 32 days.

(21) Appl. No.: 15/290,857

(22) Filed: Oct. 11, 2016

(65) Prior Publication Data

US 2018/0103455 A1 Apr. 12, 2018

(51) Int. Cl.
| | |
|---|---|
| H04W 72/02 | (2009.01) |
| H04L 12/801 | (2013.01) |
| H04L 5/00 | (2006.01) |
| H04W 8/22 | (2009.01) |
| H04B 7/0413 | (2017.01) |
| H04W 88/08 | (2009.01) |
| H04L 12/911 | (2013.01) |

(52) U.S. Cl.
CPC ............. *H04W 72/02* (2013.01); *H04L 5/00* (2013.01); *H04L 47/29* (2013.01); *H04W 8/22* (2013.01); *H04B 7/0413* (2013.01); *H04L 47/827* (2013.01); *H04W 88/08* (2013.01)

(58) Field of Classification Search
None
See application file for complete search history.

(56) References Cited

U.S. PATENT DOCUMENTS

| 2013/0329665 | A1* | 12/2013 | Kadous | H04W 72/048 370/329 |
| 2013/0336242 | A1* | 12/2013 | Rajagopal | H04W 72/0453 370/329 |
| 2014/0169317 | A1* | 6/2014 | Gao | H04B 7/0404 370/329 |
| 2015/0201326 | A1 | 7/2015 | Kazmi et al. | |
| 2015/0229383 | A1* | 8/2015 | Chen | H04B 7/0885 370/329 |

(Continued)

OTHER PUBLICATIONS

PCT Seach Report and Written Opinion dated Jan. 16, 2018 for PCT Application No. PCT/US17/54873, 14 pages.

*Primary Examiner* — Diane Lo
(74) *Attorney, Agent, or Firm* — Lee & Hayes, PLLC

(57) ABSTRACT

Systems and processes may be implemented to evaluate current network conditions with respect to a telecommunication device and to dynamically toggle the device between a Multiple-input Multiple-output (MIMO) communication mode and a Carrier Aggregation (CA) communication mode. The device may use either the MIMO mode or the CA mode to exchange data with a network operator while remaining locked onto a primary base station. Thus, rather than being statically assigned based on a fixed priority to use a particular communication mode for data exchanges with the primary base station, for example assigning all MIMO 4×4 capable devices to use MIMO 4×4 throughout its time within a primary cell, a device may be dynamically assigned and re-assigned to use a plurality of different communication modes at different times based on which mode will achieve optimal performance.

19 Claims, 6 Drawing Sheets

(56) References Cited

U.S. PATENT DOCUMENTS

2015/0282154 A1 10/2015 Yavuz et al.
2016/0127017 A1 5/2016 Kahrizi et al.
2016/0127055 A1* 5/2016 Dayal .................. H04B 17/309
                                                          370/252

* cited by examiner

DYNAMIC SELECTION OF DATA EXCHANGE MODE FOR TELECOMMUNICATION DEVICES

BACKGROUND

Modern telecommunications networks and user devices may support multiple communications technologies depending on a current configuration of user devices. For example, a telecommunication device could exchange data via 4×4 MIMO while locked onto a first base station and then, upon being handed over to a second base station, via Carrier Aggregation. However, many devices are unable to concurrently perform various technologies such as 4×4 MIMO and Carrier Aggregation. Typically, a telecommunication device is obedient to a particular base station with regard to which technology to use at any given time. Moreover, base stations instruct devices to utilize technologies according to a fixed priority ranking. For example, a device capable of performing Carrier Aggregation and MIMO 4×4 will be instructed to operate with 4×4 MIMO for the duration of time that it is locked onto a particular cell. However, each technology is associated with various benefits and detriments which are dependent on network conditions. For example, while MIMO 4×4 may offer increased spectral efficiency, it may still be unable to outperform Carrier Aggregation in terms of maximizing data transfer rate. Accordingly, a technology that is generally preferable to another may still not be universally preferable to the other technology.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for evaluating current network conditions with respect to a telecommunication device and causing the telecommunication device to dynamically toggle between communication modes. The communication modes may include a Multiple-input Multiple-output (MIMO) mode and a Carrier Aggregation (CA) mode—either one of which may be used at any particular point in time to exchange data with a network operator while remaining locked onto a primary base station. Thus, rather than being statically assigned based on a fixed priority to use a particular communication mode for data exchanges with the primary base station (e.g. assigning all MIMO 4×4 capable devices to use MIMO 4×4 throughout its time within a primary cell), a device may be dynamically assigned and re-assigned to use a plurality of different communication modes at different times based on which mode will achieve optimal performance.

To dynamically select between the communications modes for any particular telecommunication device, a network operator may receive capabilities information from individual telecommunication devices. For example, upon initially becoming "locked on" to a primary base station, a telecommunication device may inform a connection manager that it is equipped to communicate via either one of the MIMO mode or the CA mode. Then, throughout the telecommunication device's time being "locked on" to the primary base station, the connection manager may continually and/or periodically analyze various factors to re-evaluate which of the MIMO mode or the CA mode the telecommunication device should use to achieve optimal performance and periodically instruct the telecommunication device to re-configure itself according to the currently preferred communication mode. It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results.

Figure 1:
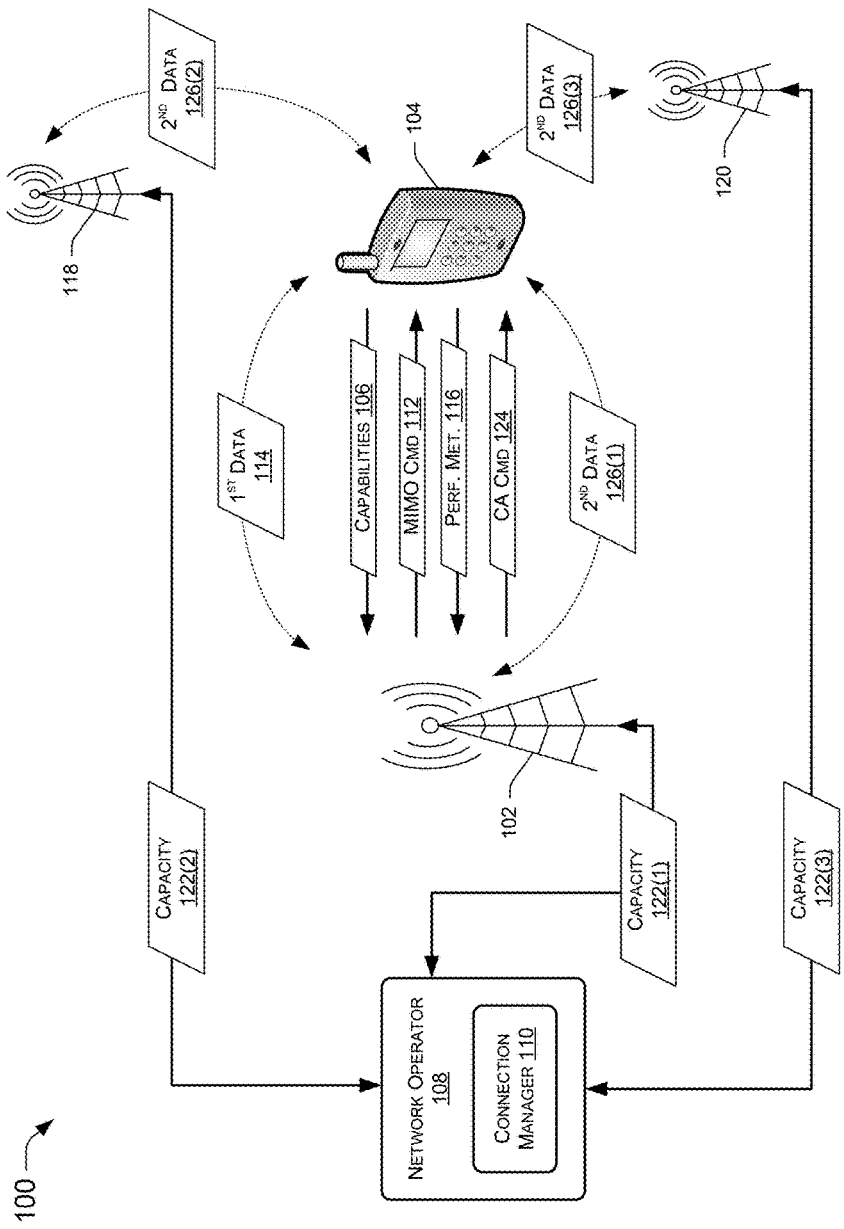
FIG. 1 illustrates an example environment in which a telecommunication device is instructed to dynamically toggle between a Multiple-input Multiple-output (MIMO) communication mode and a Carrier Aggregation (CA) communication mode while remaining locked onto a primary base station.

FIG. 1 illustrates an example environment 100 in which a telecommunication device 104 is instructed to dynamically toggle between a Multiple-input Multiple-output (MIMO) communication mode and a Carrier Aggregation (CA) communication mode while remaining locked onto a primary base station. The order in which various depicted operations occur is not limiting, and thus the operations associated with the figures described herein may be performed in a different order and/or some operations may be performed in parallel with other operations and/or some operations may be omitted.

As illustrated in FIG. 1, upon establishing a connection with a primary base station 102, a telecommunication device 104 may transmit capabilities information 106 to a network operator 108 that operates or is in communication with a connection manager 110. The capabilities information 106 may indicate a plurality of communication modes which the telecommunication device 104 is configurable to operate in at any given time. In some embodiments, the telecommunication device 104 may be of a user equipment category which is capable of operating in either one of a MIMO mode and a CA mode but not concurrently. For example, in order to switch between communication modes the telecommunication device may be required to re-configure componentry to specifically enable a particular mode such that if the componentry is configured to perform in the MIMO mode it cannot also perform the CA mode until reconfigured to do so. Furthermore, the telecommunication device 104 may be obedient to commands regarding which particular communication mode to use. In particular, in various embodiments, the telecommunication device 104 does not unilaterally determine which communication mode to operate in but rather obeys communication mode commands received from some external entity, e.g. the connection manager 110 via the primary base station 102.

In various embodiments, the network operator 108 may be any sort of network operator, such as a telecommunication service provider that operates a telecommunication infrastructure, including access networks and a core network, to provide telecommunication services such as voice calling, video calling, messaging, email, and data (e.g., streaming video and audio or web browsing). The network operator 108 may offer these services as part of service plans subscribed to by telecommunication device users or may allow the services to be purchased incrementally (e.g., per packet, per communication session, per connection, etc.).

In various embodiments, the connection manager 110 may provide remote device connection management services for the purpose of controlling which base stations, and/or component carriers thereof, that the telecommunication device 104 exchanges data through to the network operator 108. The connection manager 110 may be associated with the network operator 108, e.g. may be a department or subsidiary of the network operator 108. The connection manager 110 may also be a separate entity such as a service that the network operator 108 subscribes to for assistance in managing communication modes and/or channels. The connection manager 110 may receive the capabilities data 106 and the performance metrics 116 from the telecommunication device 104 in addition to current capacity data 122 from the network operator's 108 base stations. Then, the connection manager 110 may determine a preferred communication mode in real time using communication mode selection criteria.

Figure 4:
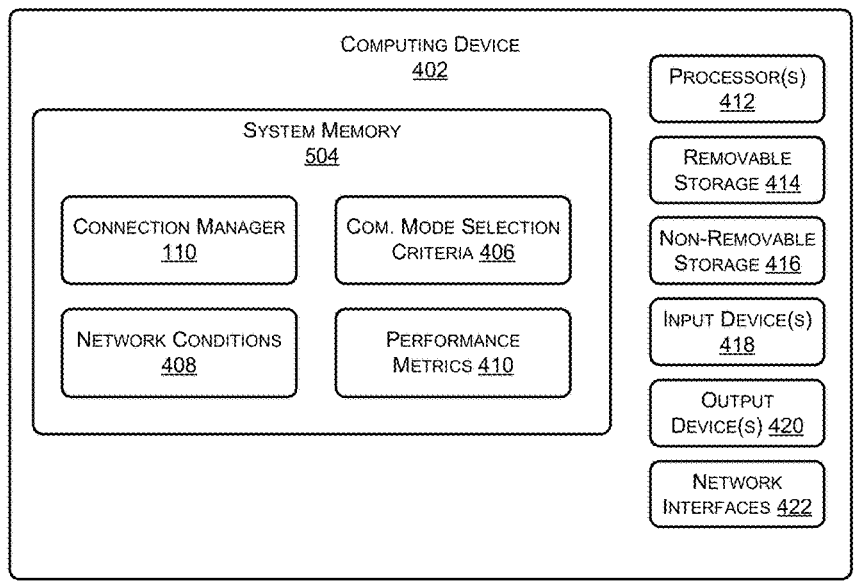
FIG. 4 illustrates an example computing device this is configured with a connection manager for determining a preferred communication mode for individual telecommunication devices in real time based on communication mode selection criteria and, once determined, commanding the individual telecommunications device to operate according to the communication preferred mode.

In various embodiments, each of the network operator 108 and the connection manager 110 may be associated with one or more computing devices. Such computing devices may each be any of a server or server farm, multiple, distributed server farms, a mainframe, a work station, a personal computer (PC), a laptop computer, a tablet computer, an embedded system, or any other sort of device or devices. In some embodiments, the computing devices may form a cloud computing device. In some embodiments, the computing devices may include one or more virtual machines. An example computing device is illustrated in FIG. 4 and described below with reference to that figure.

Figure 3:
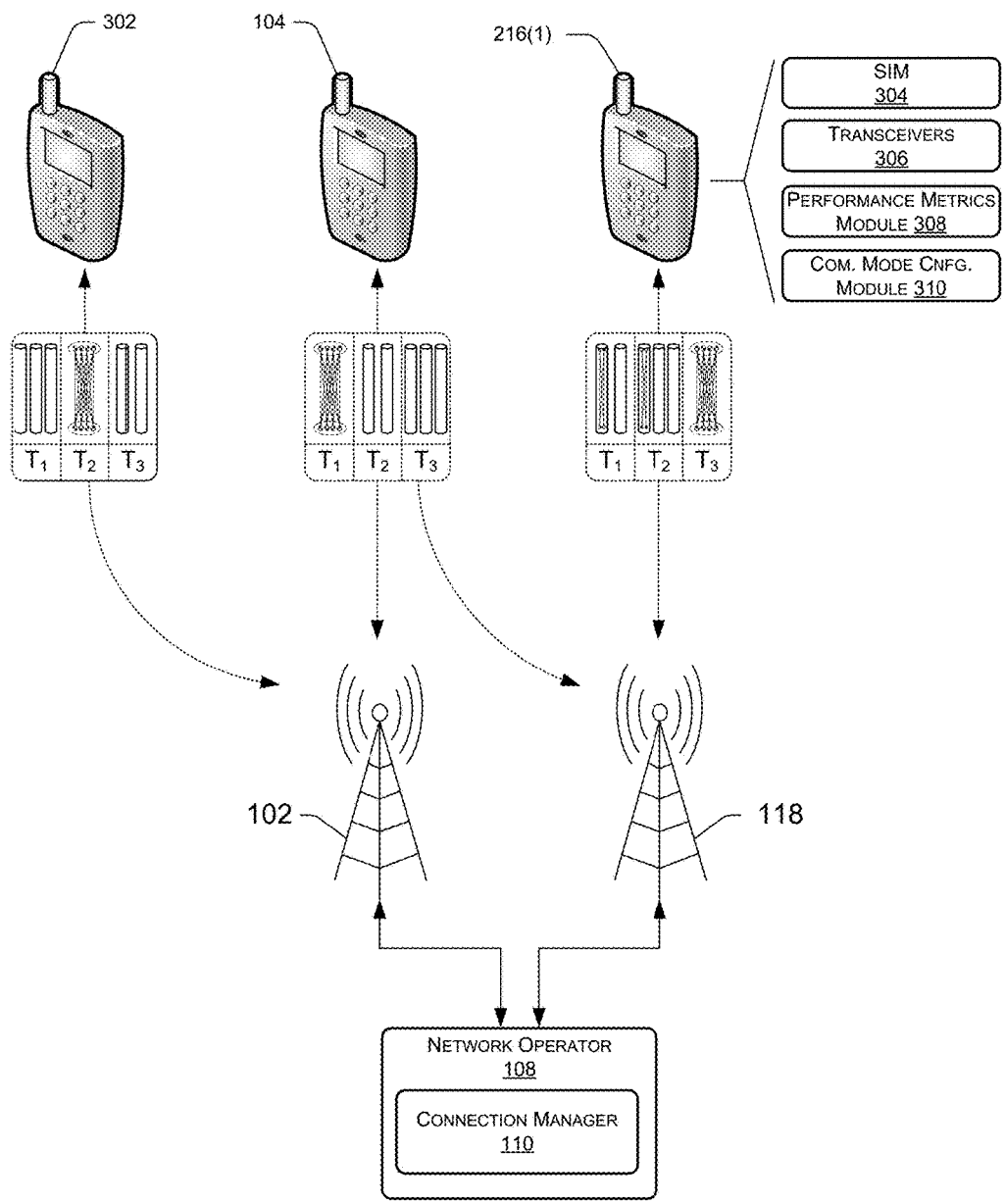
FIG. 3 illustrates a primary base station simultaneously exchanging data with a plurality of telecommunication devices that are operating in both MIMO communication modes and CA communication modes.

In various embodiments, the telecommunications device 104 may be any sort of device capable of engaging in data exchanges using multiple discrete communication modes. For example the telecommunications device 104 may be any of a smart phone, a tablet computer, a personal digital assistant (PDA), a personal computer (PC), a laptop computer, a media center, a work station, etc. An example telecommunications device 104 is illustrated in FIG. 3 and described below with reference to that figure.

In some embodiments, upon receiving the capabilities information 106 the connection manager 110 may make an initial determination as to which communication mode the telecommunication device 104 is to begin operating in while "locked onto a particular base station. For example, if the capabilities information 106 indicates that the telecommunication device 104 is capable of configuring itself to operate in either the MIMO mode or the CA mode then the connection manager 110 may determine that the telecommunication device 104 should initially operate in the MIMO mode; therefore, the connection manager 110 may transmit to the telecommunication device 104 a MIMO command 112 to cause the telecommunication device 104 to configure itself to operate in the MIMO mode. Following receipt of the MIMO command 112, the telecommunication device 104 may configure itself accordingly to receive and/or transmit first data 114 from and/or to the primary base station 102 using the MIMO mode.

In some embodiments, the connection manager 110 may send the MIMO command 112 as a default command, e.g. the MIMO command may be sent upon any telecommunication device that is capable of using the MIMO mode locking onto the primary cell 102. Then, once communications begin between the network operator 108 and the telecommunication device 104 the connection manager 110 may begin to dynamically determine which communication mode the telecommunication device 104 should currently be using. In some embodiments, the connection manager 110 may make a specific determination as to which communication mode is currently preferred prior to sending an initial communication mode command. For example, the connection manager 110 may determine based on signal strength data and available capacity data that the MIMO mode is preferred even prior to initially sending the MIMO command 112.

While the telecommunication device 104 is "locked onto" the primary base station 102 the connection manager 110 may be receiving various types of data that is relevant in determining which communication mode is currently optimal. For example, the telecommunication device 104 may generate performance metrics 116 associated with a current state of service being provided by the network operator 108 and/or signal qualities associated with the primary base station 106 and one or more other base stations, e.g. secondary base station 118 and/or tertiary base station 120. As a more specific, but non-limiting example, the performance metrics 116 may indicate that a signal strength of the primary base station 102 is relatively weak at the telecommunication device 104 and that signals are also available from base stations 118 and/or 120. In some embodiments, the performance metrics 116 include signal strength data in the form of an average of a signal's power across its specified bandwidth. For example, the performance metrics 116 may include standard Received Signal Received Power (RSRP) measurements that are generated for use in base station selection, reselection, and handover triggering. In various embodiments, the performance metrics 116 may also discretely indicate with respect to one or more base stations a Signal-to-Noise Ratio (SNR), a Signal-to-Interference Plus Noise Ratio (SINR), a Signal-to-Noise Plus Distortion Ratio (SNDR), or any combination thereof. In some embodiments, the telecommunication device 104 may calculate a channel quality indicator (CQI) for inclusion within the performance metrics 116. For example, a CQI may be calculated using any relevant factors such as, for example, RSRP, SNR, SINR, SNDR, or any combination thereof.

In addition to receiving performance metrics 116 from the telecommunication device 104, the connection manager 110 may also receive relevant data from sources other than the telecommunication device 104. For example, while the telecommunication device 104 is "locked onto" the primary base station 102 the connection manager 110 may also be receiving non-device specific data such as current capacity data 122 associated with an available capacity of various base stations, e.g. current capacity data 122(1) which corresponds to the primary base station 102 or current capacity data 122(2) which corresponds to the secondary base station 118. In some embodiments, current capacity data 122 associated with any particular base station indicates specific available capacities for a plurality of discrete carriers of the particular base station. Such carriers may exist in a single band or across multiple bands of spectrum. For example, the network operator 108 may have access to (e.g. be licensed to use) multiple bands of spectrum some or all of which may include multiple carriers or channels. As used herein, the term "carrier" or "channel" refers to a specific spectral resource block defined in terms of frequency (and in some instances time). Additionally, the term "component carrier" is used to refer to a carrier that has been logically grouped or aggregated together with one or more other carriers and then allocated to the same telecommunication device. Such aggregation of multiple carriers, which may be contiguous or non-contiguous and/or from the same band or different bands, enables the telecommunicated device to exchange (receive and/or transmit) data over multiple component carriers simultaneously from a primary serving cell and/or additional serving cells thereby increasing available bandwidth usable by the telecommunication device. For example, according to release-10 of the LTE-Advanced standards, a maximum bandwidth of 100 MHz can be simultaneously allocated to a device by aggregating up to 5 component carriers each of which may be up to 20 MHz in size.

Upon receiving the performance metrics 116 and the current capacity data 122, the connection manager 110 may use communication mode selection criteria to determine in real-time or substantially real-time a preferred communication mode. For example, while the first data 114 is being received by the telecommunication device 104, the connection manager 110 may determine that a switch from the MIMO mode to the CA mode will increase performance based on (i) the performance metrics 116 indicating that the transmission rate and/or quality associated with the first data is poor and that the telecommunication device 104 is within range of one or more other carriers of base stations 118 and 120 and (ii) the available capacity data 122 indicating that the one or more other carriers have excess capacity. Accordingly, a CA command 124 may be transmitted to the telecommunication device 104 to cause the device to re-configure itself to operate in the CA mode. Once the reconfiguration process has completed, the telecommunication device 104 may begin to use one or more of the other carriers as component carriers for the CA mode to receive second data 126. For example, in some situations, the telecommunication device 104 may begin receiving portions of the second data 126 from each of base stations 102, 118, and 120.

In some embodiments, the determination of which communication mode to use may be based on a current demand for data from the telecommunication device 104 specifically. For example, a user of the telecommunication device may need access to email all day and may also enjoy watching streaming video content on the telecommunication device 104 while bussing to and from work. Accordingly, during the user's commute the data demand from the telecommunication device 104 may increase sharply as the user begins to stream video content on her bus ride. Therefore, the connection manager 110 may recognize the increased demand for data and may factor this into the substantially real-time determination of the preferred communication mode. For example, just prior to the user initiating the streaming video content the telecommunication device 104 may be operating in the MIMO mode (e.g. MIMO 4×4) within a specific carrier or channel. Although the spectrum usage efficiency for that specific carrier may be sufficient for sending and receiving emails and/or streaming audio content, the specific carrier may still be unable to provide data rates high enough for the video content to be streamed without interruption, e.g. lack of appropriate buffering and pausing of playback. Thus, in some implementations, the connection manager 110 may send the CA command 124 to the telecommunication device 104 based on an increased demand for data from the device 104 and an identification of one or more carriers that have enough available capacity to serve as a secondary component carrier (or tertiary component carrier, etc) in the CA operation mode.

Figure 2:
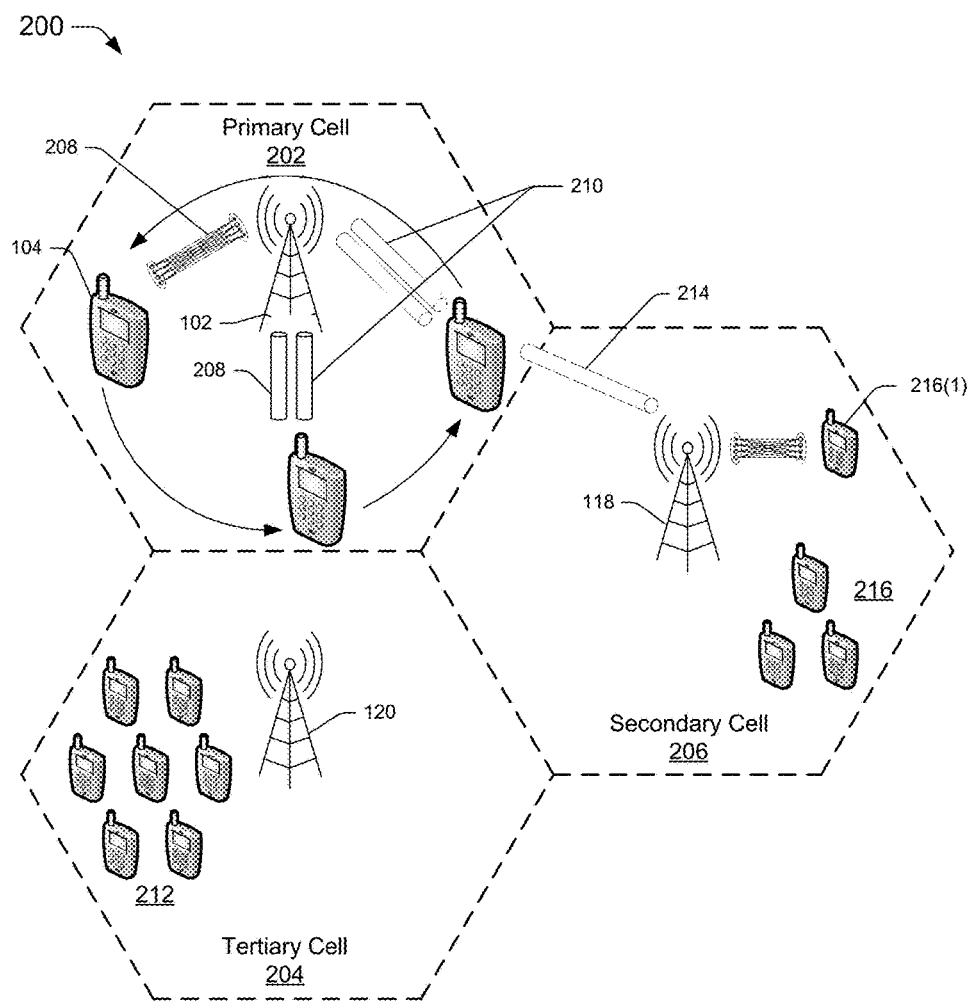
FIG. 2 illustrates an example environment in which a telecommunication device moves between various locations within a primary cell and is caused to toggle between the MIMO mode and the CA mode based on network conditions at the various locations.

FIG. 2 illustrates an example environment 200 in which a telecommunication device 104 moves locations within a primary cell 202 and is caused to toggle between the MIMO mode and the CA mode based on network conditions at the various locations. Various factors such as, for example, a distance from any particular base station or other telecommunications devices loading on (e.g. demand for data from) various base stations may affect which communication mode is preferred at any given point in time and/or at any one of the various locations. For example, as illustrated the telecommunication device 104 is shown to travel to three distinct locations within the primary cell, i.e. the device 104 first travels from the left hand side of the primary cell 202 (i.e. the first location) to the bottom of the primary cell 202 which borders the tertiary cell 204 (i.e. the second location) and then to the right hand side of the primary cell 202 bordering the secondary cell 206 (i.e. the third location). Throughout the telecommunication device's 104 time in primary cell 202 it remains "locked" onto the primary base station 102 and/or a primary carrier 208 (which may be used as a primary component carrier in the CA mode) from the primary base station 102. Initially, at the first location the telecommunication device 104 is operating in the MIMO communication mode to exchange (e.g. upload and download) data with the primary base station 102. In the figures, a carrier or channel being used for MIMO-based data exchange is illustrated with a corresponding number of antennas being used to exchange data, e.g. at the first location the primary carrier 208 is being used to perform 4×4 MIMO communications. The MIMO communication mode may be preferred over the CA communication mode at the first location due to a relatively high CQI score for the primary carrier 208 at that location and/or a relatively low required rate for data exchange between the primary base station 102 and the telecommunication device 104.

Once the telecommunication device 104 moves to the second location that borders the tertiary cell 204, the signal strength for the primary carrier 208 may fall and the primary carrier 208 may be unable to provide sufficiently high data rates to the telecommunication device 104. Accordingly, the connection manager 110 may analyze the current network conditions to re-evaluate which communication mode is preferable. For example, the connection manager 110 may determine that one or more secondary carriers 210 both have available capacity and sufficiently strong signals at the telecommunication device 104 for the network performance to be improved by switching to the CA mode. Thus, the connection manager 110 may transmit a CA command 124 to the telecommunication device 104 to cause the device 104 to reconfigure itself and to begin receiving the second data 126 over both the primary carrier 208 as a primary component carrier and the secondary carrier(s) 210 as secondary component carriers. In some implementations, the connection manager 110 may also consider the loading on various base stations in determine from which base stations to have the secondary component carriers supplied from. For example, due to the tertiary base station 120 currently serving a high amount of traffic from other devices 212 while the telecommunication device 104 is at the second location, the connection manager 110 may determine not to supply any component carriers from base station 204 but rather to rely solely on the primary base station 102 for the both the primary and secondary component carriers. As illustrated, at the second location the telecommunication device 104 is operating in the CA mode with 2-channels being aggregated—both supplied from the primary base station 202. While the telecommunication device 104 is operating in the CA mode, any feasible number of channels may be aggregated from any feasible number of base stations.

The telecommunication device 104 may then move from the second location to the third location that borders the secondary cell. When the telecommunication device 104 is moved to the third location, the connection manager 110 may again reevaluate the network conditions and may determine, for example, that the CA mode remains preferred to the MIMO mode but that performance could be further increased by adding a tertiary component carrier 214 that is provided by the secondary base station 118. The secondary base station 118 may have more available capacity to provide a tertiary channel than the tertiary base station 120 due to serving few other devices 216. Thus, at the third location the communication manager 110 may cause the telecommunication device 104 to exchange data over the tertiary component carrier 214 in addition to the primary and secondary component carriers 208, 210.

In some embodiments, the configuration manager 110 manages the connectivity of the telecommunication device 104 independently from some or all of the other telecommunication devices 212 and/or 216. For example, concurrently with the telecommunication device 104 exchanging data over the tertiary carrier 214 using the CA operational mode, the other device 216(1) may be obeying a command of the communication manager 110 to exchange data with the secondary base station 118 using the MIMO mode on a single carrier. Particularly, in some embodiments, each of the base stations may be exchanging data with a plurality of different telecommunication devices that are operating on a plurality of different communication modes.

Finally, the telecommunication device 104 may travel back to the first location at which point in time the connection manager 110 again re-evaluates the network conditions and determines that the MIMO communication mode is once again preferable to the CA mode. Thus, another MIMO command 112 may be sent to the telecommunication device 104 instructing it to begin operating once again in the MIMO mode.

FIG. 3 illustrates primary base station 102 simultaneously exchanging data with a plurality of telecommunication devices that are operating in both MIMO communication modes and CA communication modes, or combinations thereof. As illustrated, individual telecommunication devices may operate in different communication modes than other devices are operating in at any given time even when communicating with the same base stations. For example, FIG. 3 shows that at $T_1$ the telecommunication device 104 is exchanging data with the primary base station 102 using the MIMO communication mode (to perform 4×4 MIMO) whereas at the same time the telecommunication device 302 is exchanging data with the primary base station 102 using the CA communication mode without MIMO technology being used on any of the three component carriers. Then, at $T_2$ the telecommunication device 104 is exchanging data with the primary base station 102 using the CA communication mode and, later still, at T3 with both of the primary base station 102 and also with the secondary base station 118 though the tertiary component carrier 214 (labeled in FIG. 2). As illustrated, $T_1$ of FIG. 3 corresponds to the first location of FIG. 2, $T_2$ of FIG. 3 corresponds to the second location of FIG. 2, etc. With respect to telecommunication device 302, at $T_2$ the device 302 has successfully toggled from using the CA communication mode to using the MIMO communication mode to continue exchanging data with the primary base station 102. Finally, at $T_3$ the telecommunication device has toggled back into the CA mode but using only two component carriers rather than the three being used at $T_1$. Accordingly, at any given time the primary base station 102 may be exchanging data with devices using both MIMO technology and CA technology depending on an evaluation of communication mode selection criteria with respect to each device.

As illustrated in FIG. 3, an individual telecommunication device such as device 216(1) may be provisioned with a subscriber identity module (SIM) 304 to authenticate and identify the device with respect to the network operator, one or more wireless transceivers 306, a performance metrics module 308, and a communication mode configuration module 310.

In some embodiments, a telecommunication device may include one or more wireless transceivers 306 for exchanging data with the network operator via one or more base stations using various communication modes, e.g. the MIMO and/or CA communication mode. The one or more transceivers 306 may include multiple antennas such that MIMO techniques are usable by the telecommunication device to exchange multiple data signals simultaneously over the same carrier, i.e. the device perform MIMO-based communication techniques. Additionally, the one or more transceivers 306 may be configurable to operate in the CA communication mode to exchange data over multiple component carriers simultaneously from a primary serving cell and/or additional serving cells. In some embodiments, the transceivers 306 may be capable of performing MIMO based communications on one or more component carriers being used in the CA communication mode. For example, as illustrated in FIG. 3, at each of $T_1$ and $T_2$ the telecommunication device 216(1) is performing MIMO 2×2 to exchange data with the base station 118 (this device's primary base station) through its primary component carrier. In some embodiments, the telecommunication devices, e.g. 216(1) and 104), may lack sufficient capabilities to perform both MIMO based communications and CA based communications simultaneously. That is, at any given point in time the telecommunication device may operate in only one of the MIMO communication mode and the CA communication mode. In some embodiments, the transceivers may be able to communicate over only a single carrier when operating in the MIMO communication mode. The one or more wireless transceivers 306 may be any sort of wireless transceivers capable of engaging in wireless, radio frequency (RF) communication. The wireless transceivers 306 may also include other wireless modems, such as a modem for engaging in WiFi, WiMax, Bluetooth, or infrared communication.

In some embodiments, a telecommunication device may include a performance metrics module 308 for reporting to the network operator 108 and/or connection manager 110 various metrics usable to determine a preferred communication mode in substantially real-time. As described above, exemplary performance metrics 116 may be any metrics associated with a current state of service being provided by the network operator 108 and/or signal qualities associated with the primary base station 106 and one or more other base stations, e.g. secondary base station 118 and/or tertiary base station 120. Thus, exemplary performance metrics include, but are not limited to, measurements of RSRP, SNR, SINR, SNDR, or any combination thereof. In some embodiments, one or more discrete measurements may be used by the performance metrics module 308 to calculate a CQI alone or in conjunction with the discrete measurements. In some embodiments, performance metrics 116 reported by the performance metrics module 308 may also include a delay, jitter, and/or packet-loss rate associated with any network connection or component thereof, e.g. a MIMO connection on a particular carrier.

In some embodiments, a telecommunication device includes a communication mode configuration module 310 for reconfiguring componentry of the telecommunication device to operate in the MIMO mode and/or the CA mode. For example, the communication mode configuration module 310 may be operable to reconfigure the one or more wireless transceivers 306 to operate in a currently preferred communication mode. In some embodiments, the communication mode configuration module 310 may toggle the telecommunication device between the MIMO mode and the CA mode at each transmission time interval (TTI) corresponding to the duration of a transmission to or from the transceivers 306. For example, in a Long Term Evolution (LTE) based network with a designated TTI of 1 ms, the communication mode configuration module 310 may reconfigure the telecommunication device to perform a specific mode each 1 ms. Moreover, in some embodiments, the connection manager 110 may re-evaluate which mode to use at each TTI and instruct the device accordingly. For example, in the connection manager 110 may send a communication mode command at each TTI or, alternatively, the connection manager 110 may make an evaluation for the telecommunication device at each TTI and send a communication mode command preferred mode has changed since the last communication mode command was sent, e.g. if the device is presumably operating in a non-preferred mode.

An example telecommunication device may also comprise a system memory storing the performance metrics module 308 and communication mode configuration module 310 in addition to numerous applications. Also, exemplary telecommunication devices include processor(s), system memory, a removable storage and non-removable storage, input device(s), and output device(s) in addition to the transceivers 306 and SIM 304. In various embodiments, system memory is volatile (such as RAM), non-volatile (such as ROM, flash memory, etc.) or some combination of the two. The performance metrics module 308, communication mode configuration module 310, and applications stored in the system memory may comprise methods, threads, processes, applications or any other sort of executable instructions. The performance metrics module 308, communication mode configuration module 310, and applications may also include files and databases. In some embodiments, the processor(s) is a central processing unit (CPU), a graphics processing unit (GPU), or both CPU and GPU, or other processing unit or component known in the art.

An exemplary telecommunication device may also include additional data storage devices (removable and/or non-removable) such as, for example, magnetic disks, optical disks, or tape. Tangible computer-readable media may include volatile and nonvolatile, removable and non-removable media implemented in any method or technology for storage of information, such as computer readable instructions, data structures, program modules, or other data. System memory, removable storage and non-removable storage are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the telecommunication device. Any such tangible computer-readable media may be part of the telecommunication device.

An exemplary telecommunication device may also have input device(s), such as a keypad, a cursor control, a touch-sensitive display, voice input device, etc., and output device(s) such as a display, speakers, etc. These devices are well known in the art and need not be discussed at length here.

FIG. 4 illustrates an example computing device this is configured with the connection manager 110 for determining a preferred communication mode for individual telecommunication devices in real time based on communication mode selection criteria and, once determined, commanding the individual telecommunications device to operate according to the preferred mode. As illustrated, a computing device 402 comprises a system memory 404 storing the connection manager 110, communication mode selection criteria 406, network conditions 408, and performance metrics 410. Also, the computing device 402 includes processor(s) 412, a removable storage 414 and non-removable storage 416, input device(s) 418, output device(s) 420, and network interface(s) 422. The computing device 402 may be associated with that is associated with the network operator 108.

In various embodiments, system memory 404 is volatile (such as RAM), non-volatile (such as ROM, flash memory, etc.) or some combination of the two. The connection manager 110, communication mode selection criteria 406, network conditions 408, and performance metrics 410 stored in the system memory 404 may comprise methods, threads, processes, applications or any other sort of executable instructions. For example, the connection manager 110 comprises any logic capable of dynamically determining for individual ones of a plurality of telecommunication device's being serviced by the network operator 108 a preferred communication mode, e.g. MIMO or CA, and instructing the individual devices accordingly as described in greater detail herein. The connection manager 110, communication mode selection criteria 406, network conditions 408, and performance metrics 410 may also include files and databases.

In some embodiments, the processor(s) 412 is a central processing unit (CPU), a graphics processing unit (GPU), or both CPU and GPU, or other processing unit or component known in the art. Computing device 402 also includes additional data storage devices (removable and/or non-removable) such as, for example, magnetic disks, optical disks, or tape. Such additional storage is illustrated in FIG.

4 by removable storage 414 and non-removable storage 416. Tangible computer-readable media may include volatile and nonvolatile, removable and non-removable media implemented in any method or technology for storage of information, such as computer readable instructions, data structures, program modules, or other data. System memory 404, removable storage 414 and non-removable storage 416 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 402. Any such tangible computer-readable media may be part of the computing device 402.

Computing device 402 also has input device(s) 418, such as a keypad, a cursor control, a touch-sensitive display, voice input device, etc., and output device(s) 420 such as a display, speakers, etc. These devices are well known in the art and need not be discussed at length here.

Computing device 402 further includes network interface(s) 422 for wired and/or wireless communication with other computing devices over one or more networks, such as any of base stations (e.g. base stations 102, 118, and or 120), public networks, private networks, or the Internet. Such network interfaces are well known in the art and need not be discussed at length here.

Figure 5:
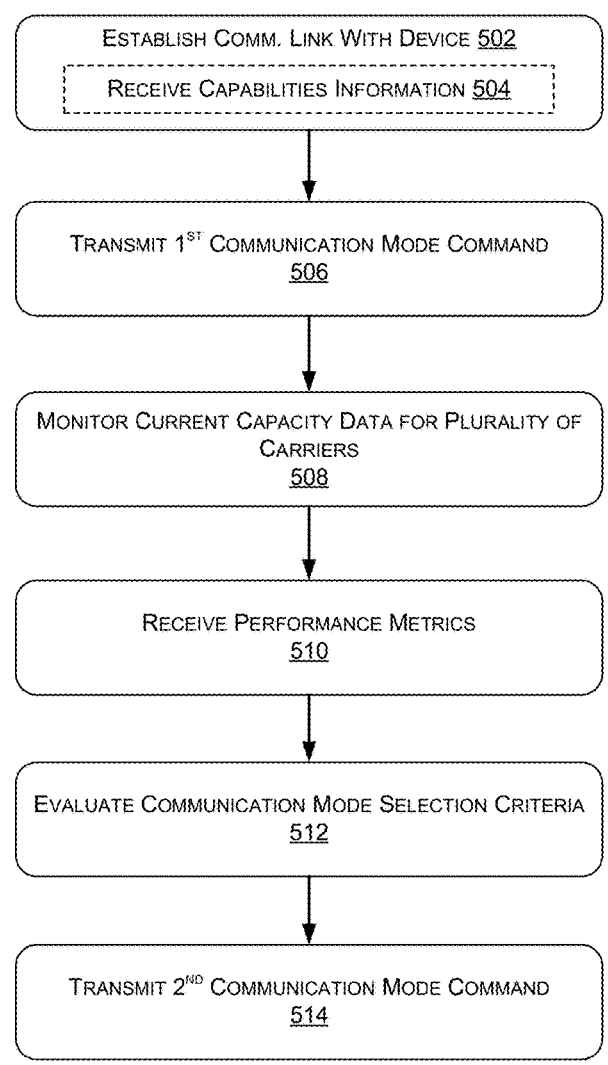
FIG. 5 is a flow diagram of an illustrative process to dynamically evaluate communication mode selection criteria against real-time capacity data and device performance metrics to determine an optimal communication mode.

FIG. 5 is a flow diagram of an illustrative process 500 to dynamically evaluate communication mode selection criteria against real-time capacity data and device performance metrics to determine an optimal communication mode. The order of the blocks below is not limiting, and thus the operations associated with the blocks below may be performed in a different order and/or some operations may be performed in parallel with other operations and/or some operations may be omitted.

At block 502, the connection manager 110 may establish a wireless communication link with a telecommunication device that is configured to selectively operate in two or more communication modes. For example, the telecommunication device may be configured to operate in either a MIMO mode or a CA mode. In some embodiments, the communication link may be established through by a particular base station upon the telecommunication device being "handed over" to that base station from another base station. Moreover, that base station may be designated as a primary base station for the telecommunication device until network conditions, e.g. relative signal strengths of various stations, trigger a handover of the telecommunication device to another base station.

At block 504, the connection manager 110 may receive, from the telecommunication device through the communication link, capabilities information indicating various communication modes that the telecommunication device is configured to operate in, e.g. the MIMO mode and the CA mode. In some embodiments, the capabilities information may be directly indicated such as through a dedicated piece of information communicated during a standard information exchange occurring each time a device connects to a base station. In some embodiments, the capabilities information may be indirectly indicated such as by being inferred from other information. For example, the telecommunications device may transmit some form of identifying information to the connection manager 110 which is then used to infer device capabilities. Exemplary types of identifying information include authentication information obtainable from the device SIM or an indication of a device type or category. For example, based on industry defined standards any device labeled as a "category 6" device may be able to support either one of CA based communications or MIMO based communications, i.e. both technologies exist on the device but cannot be performed concurrently.

At block 506, the connection manager 110 may transmit a command to the telecommunication device instructing it to operate in a first communication mode. For example, in some telecommunication networks, a telecommunication device which is configured to operate in either one of a MIMO mode or a CA mode but may be configured as obedient to instructions from one or more networks components, e.g. a base station, as to which mode to operate in at any given time. Accordingly, upon a telecommunication device connecting to any particular base station it may require specific instructions from that station as to which technology to use for further communications. Upon receipt of the command at 506, the telecommunication device may begin to receive a first amount of data through the specified communication mode over at least a first carrier. In some embodiments, the first carrier may be designated to serve as a primary component carrier upon a subsequent instruction to cause the telecommunication device to toggle to the CA mode to aggregate bandwidth from other carriers for increased assigned spectrum for the telecommunications device.

At block 508, the connection manager 110 may monitor current capacity data of at least the first or primary component carrier as well as one or more other carriers. For example, the connection manager may monitor the current demand that other devices are putting on various base stations and available carriers thereof. As discussed elsewhere herein, a higher available capacity from one or more potential secondary component carriers may weigh in favor of toggling the device to the CA mode.

At block 510, the connection manager may receive performance metrics from the telecommunication device. In some embodiments, the performance metrics include various measurements and/or calculations corresponding to the receipt of the first data. For example, the performance metrics may indicate a signal strength and/or a CQI associated with carriers at various points in time.

At block 512, the connection manager may evaluate communication mode selection criteria to select between the available communication modes identified at block 504. Evaluating the communication mode selection criteria may include performing a weighted analysis of various factors which are relevant to determining which mode of the devices available communication modes is currently preferable. For example, strong RF conditions such as a good CQI for a device may weigh in favor of instructing a device to operate in a MIMO communication mode in which data exchanges are layered on a single carrier to obtain very high spectral efficiently. As another example, a need for increasing data transmission rates (e.g. to stream HD video content) may weigh in favor of instructing the device to operate in the CA communication mode. As yet another example, a very high load on a primary base station (e.g. due to numerous other devices being connected to and demanding data from the primary base station) may weigh in favor of offloading demand from the primary base station by instructing the device to operate in the CA mode with secondary (tertiary, etc.) component carriers being assigned from base stations other than the primary base station.

In some embodiments, evaluating the communication mode selection criteria at 512 may include analyzing comparing current capacity data to select between the MIMO communication mode and the CA communication mode at a plurality of intervals while the telecommunication device is within a geographic cell corresponding to the base station. In particular, in some embodiments, a telecommunication device is not statically assigned to use any one communication mode while "locked onto" any one primary base station.

At block 514, the connection manager may transmit a command to the telecommunication device instructing it to receive second data from the base station using the CA communication mode. Following block 514, the connection manager may continue to monitor various factors to re-evaluate a currently preferred communication mode and at some later point in time instruct to the device to re-configure itself into the MIMO mode.

Figure 6:
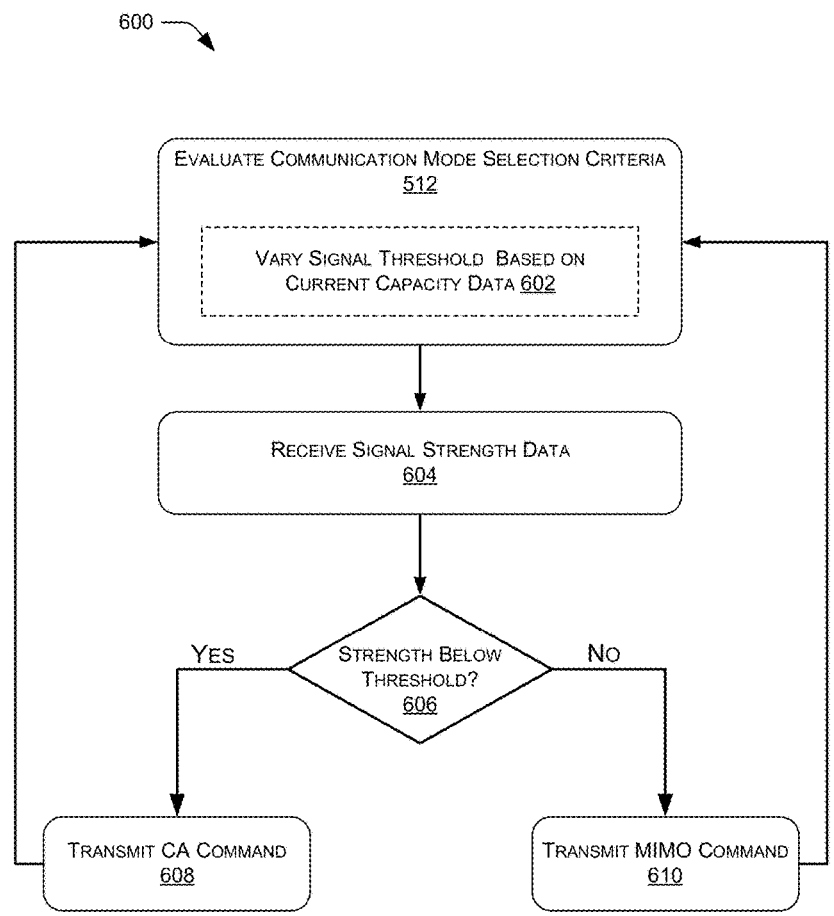
FIG. 6 is a flow diagram of an illustrative process to iteratively compare a current signal strength against a dynamically variable signal strength threshold for toggling a device between MIMO and CA communication modes.

FIG. 6 is a flow diagram of an illustrative process 600 to iteratively compare a current signal strength against a dynamically variable signal strength threshold for toggling a device between MIMO and CA communication modes.

At block 512, the connection manager may evaluate communication mode selection criteria to select between available communications modes. Evaluating the communication mode selection criteria may include performing a weighted analysis of various factors which are relevant to determine a signal strength threshold defining a signal strength of the primary carrier at which the connection manager will instruct the device to toggle to the CA mode. In some embodiments, the signal threshold may be varied at block 602 based on current capacity data indicating a current capacity of a primary base station and/or one or more other base stations. For example, if the potential component carriers from the primary station and/or the other stations are under a relatively high load such that the current capacity to serve additional devices is low, then the signal threshold may be decreased such that the signal from the primary carrier would have to be relatively low in order for the connection manager to instruct the device to use the CA mode. Alternatively, if the available capacity is great then the signal threshold may be increased such that even at a relatively high signal strength of the primary carrier, the command manager may instruct the device to use the CA mode.

At block 604, the command manager may receive signal strength data from the telecommunications device. For example, the telecommunications device may transmit performance metrics to the command manager that include one or more CQIs for the primary carrier and one or more other carriers.

At decision block 606, the command manager may determine whether the current strength of the primary carrier is below the threshold. If the signal strength is below the threshold, then the process proceeds to block 608 where the command manager commands the device to operate in the CA mode to aggregate multiple carriers for increased spectrum breadth. If the signal strength is not below the threshold, then the process proceeds to block 610 where the command manager commands the device to operate in the MIMO mode to increase spectral efficiency. Then, following either of blocks 608 or 610, the process proceeds back to block 512.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a telecommunication device via a base station, capabilities information indicating that the telecommunication device is configured to selectively operate in either a Multiple-input Multiple-output (MIMO) communication mode or a Carrier Aggregation (CA) communication mode;
transmitting, to the telecommunication device via the base station, a first command to cause the telecommunication device to receive first data from the base station on a first carrier using the MIMO communication mode;
following transmitting the first command, monitoring current capacity data associated with at least a first available capacity of at least a second carrier at a first time;
transmitting, based on the first available capacity of the second carrier at the first time, a second command to the telecommunication device via the base station to cause the telecommunication device to use the CA communication mode to receive second data from the second carrier and from and at least one of the first carrier or a third carrier;
following transmitting the second command, monitoring current capacity data associated with each of the first carrier, the second carrier, and the third carrier; and
varying a threshold level based on the current capacity data associated with the first carrier, the second carrier, and the third carrier.

2. The method of claim 1, further comprising receiving, from the telecommunication device via the base station, performance metrics associated with receiving the first data using the MIMO communication mode, and wherein the transmitting the second command is further based on the performance metrics.

3. The method of claim 2, wherein the performance metrics include one or more radio frequency (RF) signal strength indicators.

4. The method of claim 1, further comprising comparing at least the current capacity data to communication mode selection criteria to select between the MIMO communication mode and the CA communication mode at a plurality of intervals while the telecommunication device is within a geographic cell corresponding to the base station.

5. The method of claim 4, wherein at least some of the plurality of intervals correspond to one or more transmission time intervals associated with one or more packet sizes, the one or more transmission time intervals being regular intervals.

6. The method of claim 1, further comprising transmitting, based on a second available capacity of the second carrier at a second time and to the telecommunication device via the base station, a third command to cause the telecommunication device to receive third data from the base station using the MIMO communication mode.

7. The method of claim 1, wherein a first portion of the second data is received from the base station on at least one of the first carrier or the third carrier, and wherein a second portion of the second data is received from at least one different base station on the second carrier.

8. The method of claim 1, further comprising:
receiving, from a second telecommunication device via the base station, second capabilities information indicating that the second telecommunication device is configured to selectively operate in either the MIMO communication mode or the CA communication mode; and transmitting, to the second telecommunication device via the base station, third data using the MIMO communication mode while simultaneously transmitting the second data from the base station using the CA communication mode.

9. A method comprising:

establishing, by a primary base station, a communication link with a telecommunication device that is configured to selectively operate in a Multiple-input Multiple-output (MIMO) communication mode or a Carrier Aggregation (CA) communication mode;

transmitting, by the primary base station at a first time, a first command to cause the telecommunication device to use the MIMO communication mode to receive first data from the primary base station on a first carrier;

receiving, from the telecommunication device at a second time, an indication of a signal strength of the first carrier at the telecommunication device;

transmitting, by the primary base station and based on the signal strength of the first carrier being below a threshold level, a second command to cause the telecommunication device to use the CA communication mode to receive second data from a second carrier and at least one of the first carrier or a third carrier;

monitoring current capacity data associated with each of the first carrier, the second carrier, and the third carrier; and varying the threshold level based on the current capacity data associated with the first carrier, the second carrier, and the third carrier.

10. The method of claim 9, wherein the MIMO communication mode is used to receive the first data while the telecommunication device is at a first location within a geographic cell corresponding to the primary base station, and wherein the CA communication mode is used to receive the second data while the telecommunication device is at a second location within the geographic cell.

11. The method of claim 9, further comprising:

receiving, from the telecommunication device at a third time that is subsequent to the second time, a second indication of an increase in the signal strength of the first carrier at the telecommunication device; and transmitting, by the primary base station and based on the increase in the signal strength, a third command to cause the telecommunication device switch from the CA communication mode back to the MIMO communication mode to receive third data from the primary base station on the first carrier.

12. The method of claim 9, wherein at least some of the second data is received from a secondary base station that is associated with at least one of the second carrier or the third carrier.

13. The method of claim 9, further comprising:

dynamically determining, in substantially real-time based on communication mode selection criteria, a preferred one of the MIMO communication mode and the CA communication mode; and generating the second command to cause the telecommunication device to use the CA communication mode in response to the preferred one changing from the MIMO communication mode to the CA communication mode.

14. A telecommunication network communication mode management system, comprising:

one or more processors; and one or more computer readable media storing instructions that are executable by the one or more processors to perform operations comprising:

establishing, by a first base station, a communication link with a telecommunication device that is configured to selectively operate in a Multiple-input Multiple-output (MIMO) communication mode or a Carrier Aggregation (CA) communication mode;

designating the first base station as a primary base station to support the communication link with the telecommunication device;

causing the telecommunication device to use the MIMO communication mode to receive first data from the primary base station on a first carrier;

subsequent to the causing the telecommunication device to use the MIMO communication mode and while the first base station remains designated as the primary base station:

dynamically monitoring current network conditions associated with the telecommunication device;

determining, based on communication mode selection criteria and the current network conditions, that the CA communication mode is currently preferred over the MIMO communication mode;

causing the telecommunication device to switch from the MIMO communication mode to the CA communication mode to receive second data from a second carrier and at least one of the first carrier or a third carrier;

monitoring current capacity data associated with each of the first carrier, the second carrier, and the third carrier; and varying a threshold level based on the current capacity data associated with the first carrier, the second carrier, and the third carrier.

15. The system of claim 14, wherein the dynamically monitoring the current network conditions associated with the telecommunication device includes:

receiving, from the telecommunication device, signal performance data associated with at least one of the first carrier, the second carrier, and the third carrier.

16. The system of claim 15, wherein the signal performance data includes at least one of signal-to-noise ratio data, received signal received power data, or channel quality indicator data.

17. The system of claim 14, the operations further comprising:

establishing, by the first base station, a plurality of other communication links with a plurality of other telecommunication devices that are configured to operate in the MIMO communication mode or the CA communication mode;

causing at least some of the plurality of other telecommunication devices to use the MIMO communication mode simultaneously with the telecommunication device using the MIMO communication mode to receive the first data from the primary base station on a first carrier.

18. The system of claim 14, wherein the dynamically monitoring the current network conditions associated with the telecommunication device includes identifying an increase in current data usage corresponding to the telecommunication device, and wherein the causing the telecommunication device to switch from the MIMO communication mode to the CA communication mode is at least partially in response to the increase in current data usage.

19. The system of claim 14, wherein the telecommunication device is further configured to perform at least some MIMO based communications over at least one component carrier while operating in the CA communication mode.

* * * * *